United States Patent [19]
Wilmoth

[11] 3,953,891
[45] Apr. 27, 1976

[54] SOUNDHEAD RESTORE MECHANISM FOR USE IN A DISC MACHINE

[75] Inventor: Terry Lee Wilmoth, Austin, Tex.

[73] Assignee: International Business Machines Corporation, Armonk, N.Y.

[22] Filed: Mar. 17, 1975

[21] Appl. No.: 559,343

[52] U.S. Cl. .............................. 360/105; 360/86; 360/97
[51] Int. Cl.² ............... G11B 17/04; G11B 25/04; G11B 5/012
[58] Field of Search .......... 360/105, 106, 107, 109, 360/97–99, 86, 133, 135; 274/39 R, 41.4; 179/100.1 DR

[56] References Cited
UNITED STATES PATENTS

| | | | |
|---|---|---|---|
| 3,029,080 | 4/1962 | Land | 360/105 |
| 3,409,746 | 11/1968 | Skov et al. | 360/106 |
| 3,566,381 | 2/1974 | Buslik et al. | 360/98 |
| 3,789,160 | 1/1974 | Bruer et al. | 179/100.1 DR |
| 3,797,035 | 3/1974 | Hunt et al. | 274/41.4 |

Primary Examiner—Alfred H. Eddleman
Attorney, Agent, or Firm—John W. Henderson, Jr.

[57] ABSTRACT

Apparatus in a disc dictation machine for accurately positioning the soundhead at a predetermined start phasing position during the execution of a disc change cycle. The apparatus includes means for disengaging the soundhead drive pawl from the soundhead drive lead screw and linkage that interacts with a cam surface attached to the disc change loader carrier to restore the soundhead to the start phasing position on the forward stroke of the loader carrier.

2 Claims, 5 Drawing Figures

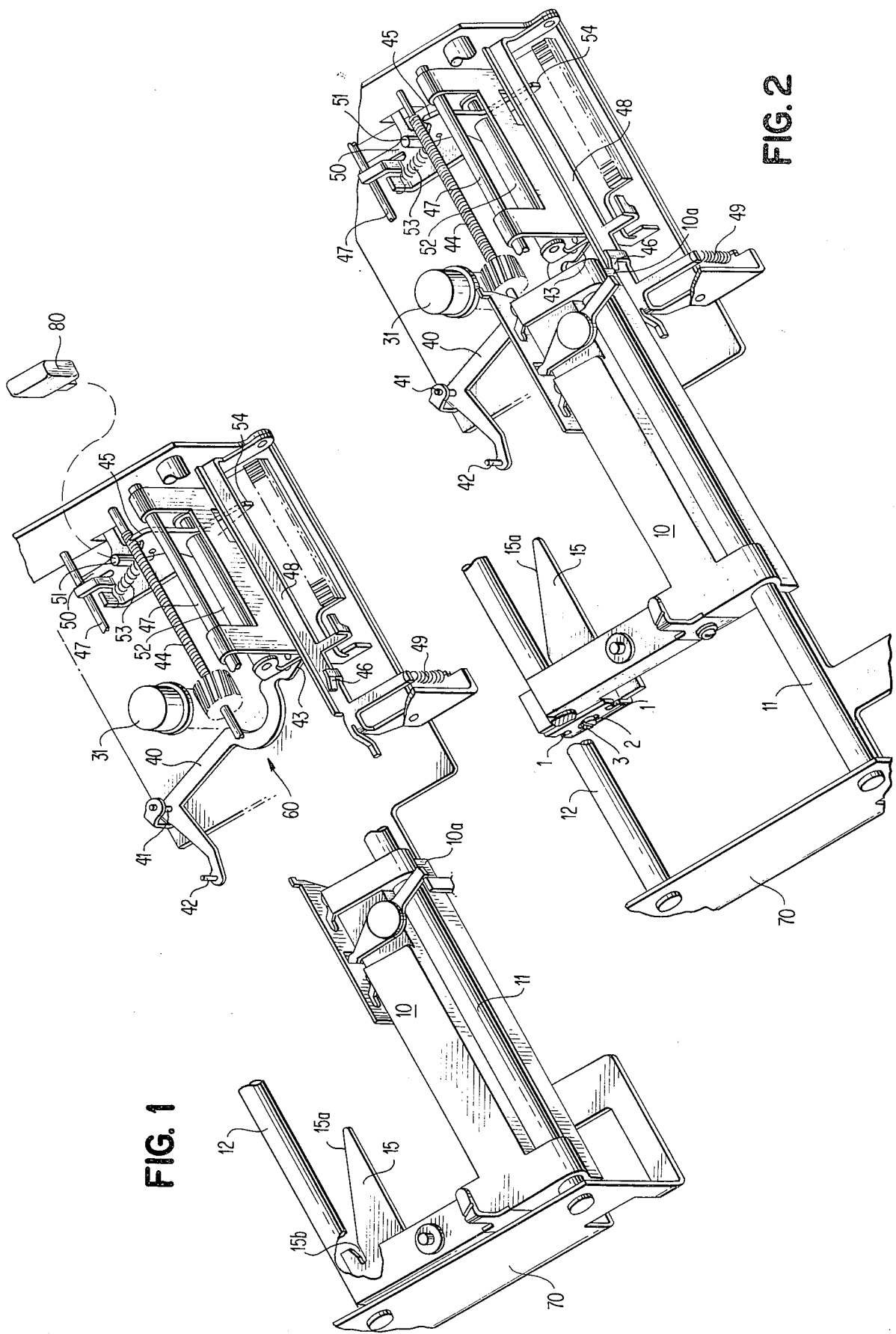

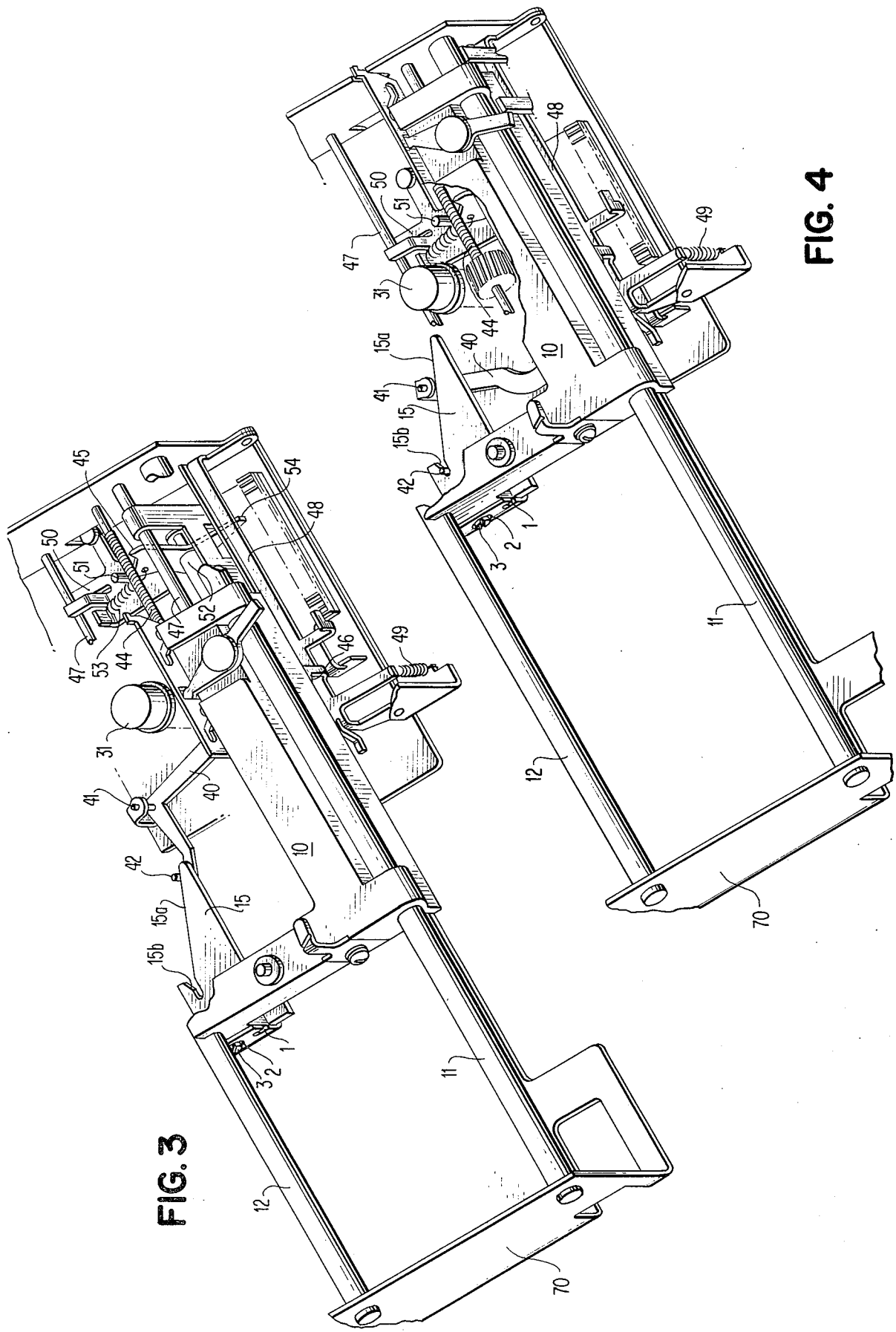

SOUNDHEAD RESTORE MECHANISM FOR USE IN A DISC MACHINE

BACKGROUND

1. Field of the Invention:

This invention relates to disc recording and transcribing apparatus and more specifically to apparatus for accurately placing the soundhead in a disc dictation machine at a predetermined position.

2. Description of the Prior Art:

U.S. Pat. No. 3,789,160 entitled "Dictation Apparatus With Disc Loading, Feeding and Ejecting Feature", issued to J. D. Bruer, et al., Jan. 29, 1974 and assigned to the same assignee as the present invention, discloses a disc dictation system featuring automated loading, feeding and unloading operations wherein the soundhead is restored to its starting position during a disc change cycle through the interaction of the soundhead transport mechanism with the disc change loader carrier mechanism. In this prior art patent, the loader carrier moves from a home position to a load/eject position to load a new disc into the record/playback station of the dictation machine. As the loader carrier returns to the home position, it interacts with the soundhead transport to restore the soundhead to its starting position. In this arrangement, the soundhead reaches its start position before the loader carrier reaches its home position and the soundhead is disengaged from the loader carrier while the loader carrier is still in motion.

In this prior art soundhead restore mechanism, accurate positioning of the soundhead at its start phasing position could not be guaranteed because the soundhead was subject to bounce when released at the loader carrier returning speed of approximately 25 inches per second. Also, this soundhead restore mechanism engaged the loader carrier as it started to accelerate toward the home position and was at a mechanical disadvantage because the loader carrier was not at full speed. This caused the changer to intermittently stall.

OBJECTS OF THE INVENTION

It is an object of the present invention to accurately position the soundhead at a start phasing position.

It is another object of the present invention to restore the soundhead without reducing the efficiency of operation of the disc changer.

SUMMARY OF THE INVENTION

In accordance with the features of this invention an improved soundhead restore apparatus is provided for returning the soundhead to a predetermined start phasing position. The apparatus is primarily made up of a soundhead transport for translating the soundhead along the surface of a disc during record/playback; a bellcrank for transmitting force to the soundhead transport during the restore operation; linkage for disengaging the normal soundhead transport function during restore; and the cam surfaces is carried by the disc change mechanism for operating the restore apparatus. Upon initiation of a disc change cycle, the disc change mechanism moves toward the load/eject station and disengages the soundhead drive mechanism. Further movement of the disc changer brings the soundhead restore cam plate into contact with the bellcrank and rotates the bellcrank causing the soundhead transport to move toward the start phasing position. The soundhead transport reaches the start phasing position simultaneously with the disc change mechanisms' arrival at the load/eject station. Release of the soundhead transport from the disc changer after the disc changer has stopped at the load/eject station insures accurate positioning of the soundhead at the start phasing position.

BRIEF DESCRIPTION OF THE DRAWINGS

FIG. 1 shows the position of the soundhead transport after completion of record or playback of a disc.

FIG. 2 shows disengagement of the soundhead drive mechanism.

FIG. 3 shows engagement of the soundhead restore cam plate with the soundhead restore bellcrank.

FIG. 4 shows the soundhead transport restored to the start phasing position.

DESCRIPTION OF THE PREFERRED EMBODIMENT

Figure 5:
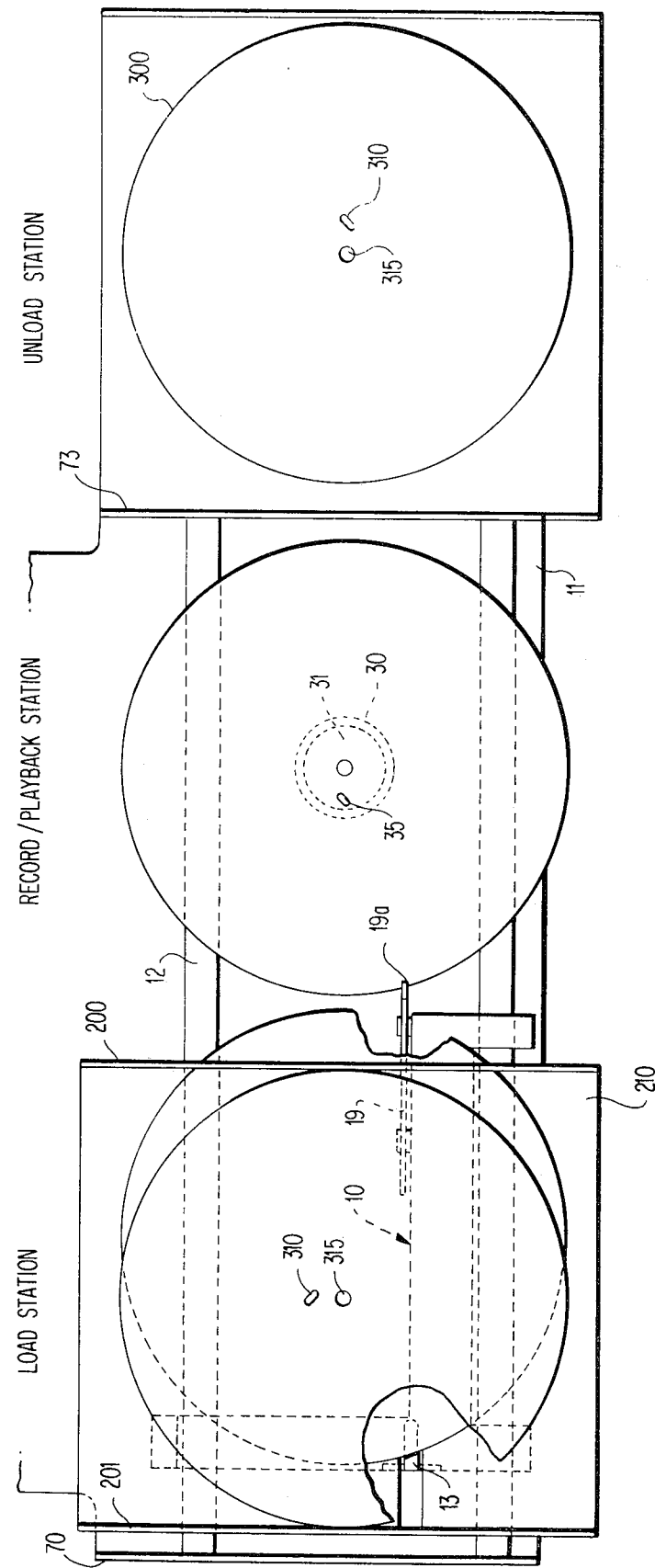
FIG. 5 is a plan view of the disc dictation machine showing disc change motion.

Referring to FIG. 1, there is shown a soundhead restore assembly generally designated by reference numeral 60 and a disc change loader carrier assembly 10 mounted on a modular unit frame 70 for use in a disc dictation machine of the type generally disclosed in U.S. Pat. No. 3,789,160, entitled "Dictation Apparatus With Disc Loading, Feeding, and Ejecting Feature", issued Jan. 29, 1974, to J. D. Bruer, D. L. Buddington, and W. F. Klein, assigned to the same assignee as the present invention. The loader carrier assembly 10 executes a disc change cycle by concurrently transferring a first disc from the record/playback station into the unload station and transferring a second disc from the load station into the record/playback of the dictation machine as shown in FIG. 5. The loader carrier 10 moves from a home position at the load station on a load/eject position at the unload and returns to the home position. The soundhead restore assembly uses the force of the loader carrier motion to restore the soundhead to a predetermined position each time a disc change cycle is executed. The loader carrier assembly 10 is fully disclosed in copending U.S. application Ser. No. 559,352, entitled "Loader Carrier Mechanism", filed Mar. 17, 1975, by J. D. Bruer and also assigned to the same assignee as the present invention.

The soundhead restore assembly 60 includes a bellcrank 40 mounted to rotate about point 41 on a stud attached to frame 70. One end of the bellcrank 40 includes integral fingers 43 which engages soundhead transport 50. The soundhead transport 50 is slidably mounted on shafts 47. A magnetic soundhead 80 resiliently attaches to stud 51 of soundhead transport 50. Soundhead transport 50 has attached to it a pawl 45 which engages the threads of lead screw 44. Pawl 45 is pivotally mounted on shaft 52 and biased into contact with the threads of lead screw 44 by spring 53. During normal record/playback operation, the rotation of lead screw 44 causes translation of soundhead transport 50 along shafts 47 to record or playback magnetic signals on a disc of the type disclosed in U.S. Pat. No. 3,797,035, entitled "Recording Media Orientation", issued Mar. 12, 1974 to R. E. Hunt and L. H. Robbins, assigned to the same assignee as the present invention, mounted on spindle 31.

A bail 48 engages the rear portion 54 of pawl 45. The bail 48 is biased by spring 49 such that it exerts no force on pawl 45 during the normal record and playback operations. The bail 48 has attached to it an integral cam surface 46. Referring now to FIG. 2, during the disc change operation, cam surface 10a of loader carrier 10 engages cam surface 46 of bail 48 and causes bail 48 to rotate pawl 45 out of contact with lead screw 44. This frees the soundhead transport 50 for translation along shafts 47 by bellcrank 40.

A soundhead restore cam plate 15 is attached to the lower side of loader carrier 10. The soundhead restore cam plate 15 includes lateral notches 1 which engage integral studs on end of loader carrier 10 and elongated aperture 2 for attachment of the cam plate 15 to loader carrier 10 using screw 3. The lateral notches 1 and the elongated aperture 2 provide means for adjusting the cam plate 15 for proper contact with the bellcrank 40. Referring to FIG. 3, further movement of the loader carrier 10 during the disc change cycle brings cam surface 15a of soundhead restore cam plate 15 into contact with bellcrank pin 42. As the loader carrier 10 continues to move toward the right, bellcrank pin 42 travels along surface 15a of soundhead restore cam plate 15 causing the bellcrank to rotate clockwise about pivot point 41 and to translate soundhead transport 50 to the left along shaft 47 toward the start phasing position. The position of soundhead restore cam plate 15 is adjusted so that bellcrank pin 42 fits into the slot between surfaces 15a and 15b when the loader carrier 10 reaches the load/eject position.

The soundhead transport 50 must be restored to the start phasing position each time a new disc is loaded on spindle 31 in the record/playback station. The start phasing position is a predetermined coarse position to which the soundhead is moved at a high rate of speed and from which it is moved slowly to the home (phased) position to start record or playback of a disc. If the soundhead transport 50 is already in the phased position, which is located to the left of the start phasing position, when a disc change cycle is executed, surface 15b of soundhead restore cam plate 15 will engage bellcrank pin 42 and rotate bellcrank 40 in the counterclockwise direction translating soundhead transport 50 to the right along shaft 47 to the start phasing position. Since movement of bellcrank pin 42 terminates in the slot between surfaces 15a and 15b of soundhead restore cam plate 15 each time a disc change cycle is executed, the soundhead transport 50 is accurately restored to the same position each time.

OPERATION

Referring to FIG. 2, when a disc change cycle is initiated the loader carrier assembly 10 is translated to the right toward the record/playback station along shafts 11 and 12. Cam surface 10a of loader carrier 10 engages cam surface 46 of bail 48 and rotates bail 48 into contact with the pawl 45. This force causes pawl 45 to rotate about shaft 52 out of contact with the threads of lead screw 44.

Referring now to FIG. 3, continued translation of loader carrier assembly 10 brings surface 15a of soundhead restore cam plate 15 into contact with bellcrank pin 42. Bellcrank pin 42 translates along cam surface 15a causing the bellcrank 40 to rotate clockwise about pivot point 41. This rotation of the bellcrank 40 translates soundhead transport 50 along shaft 47 to the left toward the start phasing position. As shown in FIG. 4, the translation of bellcrank pin 42 terminates in the slot between surfaces 15a and 15b of soundhead restore cam plate 15 as translation of the loader carrier assembly 10 terminates at the load/eject station. The loader carrier assembly 10 then returns to its home position at the left along shafts 11 and 12 and cam surface 10a disengages cam 46 of bail 48. Spring biasing means 49 attaches to bail 48 rotates bail 48 out of contact with pawl 45 allowing spring 53 to rotate pawl 45 to reengage the threads of lead screw 44.

While the invention has been particularly shown and described with reference to a particular embodiment, it will be understood by those skilled in the art that various changes in form and detail may be made without departing from the spirit and scope of the invention.

What is claimed is:

1. In a disc dictation machine having a loader carrier for effecting a disc change cycle by ejecting a first disc from a record/playback station into an unload station and transferring a second disc from a load station into the record/playback station, apparatus for positioning a magnetic soundhead at a predetermined start phasing position comprising:

a soundhead;

a soundhead transport slidably mounted for translation in a plane parallel to the surface of a disc in the record/playback station;

means resiliently attaching said soundhead to said soundhead transport;

a lead screw;

pawl means attached to said soundhead transport and resiliently engaging said lead screw for imparting translatory motion to said soundhead transport;

spring biased bail means contacting said pawl means;

a cam surface integral with said bail means for receiving force from said loader carrier to rotate said bail means into contact with said pawl means thereby disengaging said pawl means from said lead screw;

a bellcrank pivotally mounted and having a first end attached to said soundhead transport;

a pin attached to the second end of said bellcrank; and cam means attached to said loader carrier for engaging said pin during a disc change cycle and rotating said bellcrank to translate said soundhead transport and restore said soundhead to a predetermined position.

2. The apparatus of claim 1 wherein said cam means includes lateral notches in the body thereof and an elongated aperture aligned with said lateral notches for adjustably attaching said cam means to said loader carrier.

* * * * *